US011810686B2

(12) United States Patent
Anderson et al.

(10) Patent No.: US 11,810,686 B2
(45) Date of Patent: Nov. 7, 2023

(54) QUANTUM SENSOR REPLENISHMENT

(71) Applicant: ColdQuanta, Inc., Boulder, CO (US)

(72) Inventors: Dana Zachary Anderson, Boulder, CO (US); Clifton Leon Anderson, Patterson, CA (US)

(73) Assignee: ColdQuanta, Inc., Boulder, CO (US)

( * ) Notice: Subject to any disclaimer, the term of this patent is extended or adjusted under 35 U.S.C. 154(b) by 0 days.

(21) Appl. No.: 17/391,194

(22) Filed: Aug. 2, 2021

(65) Prior Publication Data
US 2021/0383939 A1   Dec. 9, 2021

Related U.S. Application Data

(60) Division of application No. 16/933,049, filed on Jul. 20, 2020, now Pat. No. 11,257,605, which is a
(Continued)

(51) Int. Cl.
*G21K 1/00* (2006.01)
*G01C 19/58* (2006.01)
(Continued)

(52) U.S. Cl.
CPC ............. *G21K 1/006* (2013.01); *G01C 19/58* (2013.01); *G01C 19/62* (2013.01); *G01P 15/00* (2013.01)

(58) Field of Classification Search
CPC ........ G21K 1/006; G01C 19/58; G01C 19/62; G01P 15/00; G01P 15/08; G01P 15/093
(Continued)

(56) References Cited

U.S. PATENT DOCUMENTS 10,504,033 B1   12/2019  King
2008/0197339 A1*  8/2008  Regan .................. B81B 3/0021
                                                    117/201
(Continued)

OTHER PUBLICATIONS

Huang, J.Q.; Yan, X.S.; Wu, C.F., Zhang, J.W.; and Feng, L.J.; "Intense source of cold cesium atoms based on a two-dimensional magneto-optical trap with independent axial cooling and pushing"; Atomic Physics, Sep. 24, 2015.
(Continued)

*Primary Examiner* — Kiet T Nguyen
(74) *Attorney, Agent, or Firm* — Van Pelt, Yi & James LLP; Clifton Leon Anderson

(57) ABSTRACT

Atom-scale particles, e.g., neutral and charged atoms and molecules, are pre-cooled, e.g., using magneto-optical traps (MOTs), to below 100 μK to yield cold particles. The cold particles are transported to a sensor cell which cools the cold particles to below 1 μK using an optical trap; these particles are stored in a reservoir within an optical trap within the sensor cell so that they are readily available to replenish a sensor population of particles in quantum superposition. A baffle is disposed between the MOTs and the sensor cell to prevent near-resonant light leaking from the MOTs from entering the sensor cell (and exciting the ultra-cold particles in the reservoir). The transporting from the MOTs to the sensor cell is effected by moving optical fringes of optical lattices and guiding the cold particles attached to the fringes along a meandering path through the baffle and into the sensor cell.

3 Claims, 4 Drawing Sheets

Related U.S. Application Data continuation-in-part of application No. 16/445,341, filed on Jun. 19, 2019, now Pat. No. 10,755,831.

(60) Provisional application No. 62/832,448, filed on Apr. 11, 2019.

(51) Int. Cl.
*G01P 15/00* (2006.01)
*G01C 19/62* (2006.01)

(58) Field of Classification Search
USPC .......................................................... 250/251
See application file for complete search history.

(56) References Cited

U.S. PATENT DOCUMENTS

| | | |
|---|---|---|
| 2016/0298967 A1 | 10/2016 | Johnson |
| 2017/0299389 A1 | 10/2017 | Johnson |
| 2018/0066942 A1 | 3/2018 | Compton |
| 2020/0161446 A1* | 5/2020 | Anderson .............. B82Y 20/00 |
| 2020/0233025 A1 | 7/2020 | Salim |

OTHER PUBLICATIONS

Mahnke, J.; Kruse, I; Huper, A.; Jollenbeck, S.; Ertmer, W.; Arlt, J.; and Klempt, C.; "A continuously pumped reservoir of ultracold atoms". Quantum Physics, Jun. 22, 2015.

Dalibard, J.; and Cohen-Tannoudji, C.; "Laser cooling below the Doppler limit by polarization gradients: simple theoretical models", Journal of the Optical Society of America, Jun. 29, 1989.

Dinardo, Brad A.; "Single Atom Delivery into a Bottle Beam Trap Using an Optical Conveyor Belt and an Ultracold Gain Mechanism in a Matterwave Transistor Oscillator", A thesis submitted to the Faculty of the Graduate School of the University of Colorado in partial fulfillment of the requirements for the degree of Doctor of Philosophy, Department of Physics, Boulder, Colorado, 2018.

Humbert, I. L. H.;"All-optical 87Rb Bose-Einstein condensate apparatus: Construction and operation", a Ph.D. thesis by I. L. H. Humbert, submitted to The University of Queensland, School of Mathematics and Physics, Queensland, Austrailia, 2012.

* cited by examiner

QUANTUM SENSOR REPLENISHMENT

BACKGROUND

Due to their high sensitivity, quantum sensors, e.g., gravimeters, gravity gradiometers, gyroscopes, and magnetometers, can provide improvements over other state-of the art sensors. Typically, quantum sensors require populations of ultra-cold particles (e.g., neutral and charged atoms and molecules) in quantum superposition. Obtaining a reading from a quantum sensor typically requires driving sensor particles out of quantum superposition so that subsequent readings require newly generated quantum sensor particles. What is needed is a quantum sensor system that minimizes or eliminates the durations over which read-outs are delayed due to an insufficient sensor particle population.

DETAILED DESCRIPTION

The present invention provides for optically trapping ultra-cold particles to be used in a reservoir to replenish a sensor population of particles in quantum superposition continuously or promptly upon demand. While the use of a particle reservoir to feed the sensor population eliminates or minimizes inter-readout latency due to particle preparation, there remains the challenge of establishing and maintaining such a reservoir.

The present invention provides for a sensor cell as a site for the reservoir and, in most cases, the sensor population. The sensor cell can maintain an ultra-high vacuum (UHV, correspond ng to pressures below $10^{-10}$ Torr). An "atom chip" is an integrated circuit useful for manipulating quantum particles. Typically, an atom chip has an ambient-facing face and a vacuum-facing face. Conductors on the vacuum facing face can generate magnetic fields in the UHV interior of a sensor cell; the currents can be generated by electronics outside the UI-IV and delivered to the conductors by conductive vias extending through the atom-chip. The magnetic fields generated by the atom chip can be used to transfer particles into and out from the reservoir, to confine particles to the reservoir, and to cool particles to ultra-cold (<1 µK) temperatures.

High-energy particles that might otherwise interact with and heat the reservoir particles are excluded from the sensor cell. The particles that do enter the sensor cell are pre-cooled to yield particles below 100 µK to yield "cold" particles. A pre-cooler can use near-resonant (capable of causing energy-level transitions in the particles) laser beams to trap (with the help of magnets) and cool the particles. The resulting cold particles can then be transported to the sensor cell.

The near-resonant light must be excluded from the sensor cell; otherwise, it could excite and heat the reservoir particles. In some embodiments, a baffle is used to trap any near-resonant light leaking from the pre-cooler so that it does not enter the sensor cell. The transporter can guide the cold particles along a meandering path through the baffle and into the sensor cell without allowing in the near-resonant light.

The transport mechanism can use one or more optical lattices. An optical lattice is formed by interfering counter-propagating laser beams to form bright (constructive) and dark (destructive) fringes. Particles are attracted to and trapped by the bright fringes. By sweeping the frequency of at least one of the counter-propagating laser beams, the fringes can be made to move, dragging the trapped particles along the optical conveyor belt. The transport mechanism can use a series of two or more straight-line-segment optical lattices to define a meandering path; alternatively, one or more multi-dimensional lattices can be used to define a meandering path through the baffle into the sensor cell for ultra-cooling, maintenance in the reservoir, and replenishment of the continuous quantum sensor.

Figure 1:
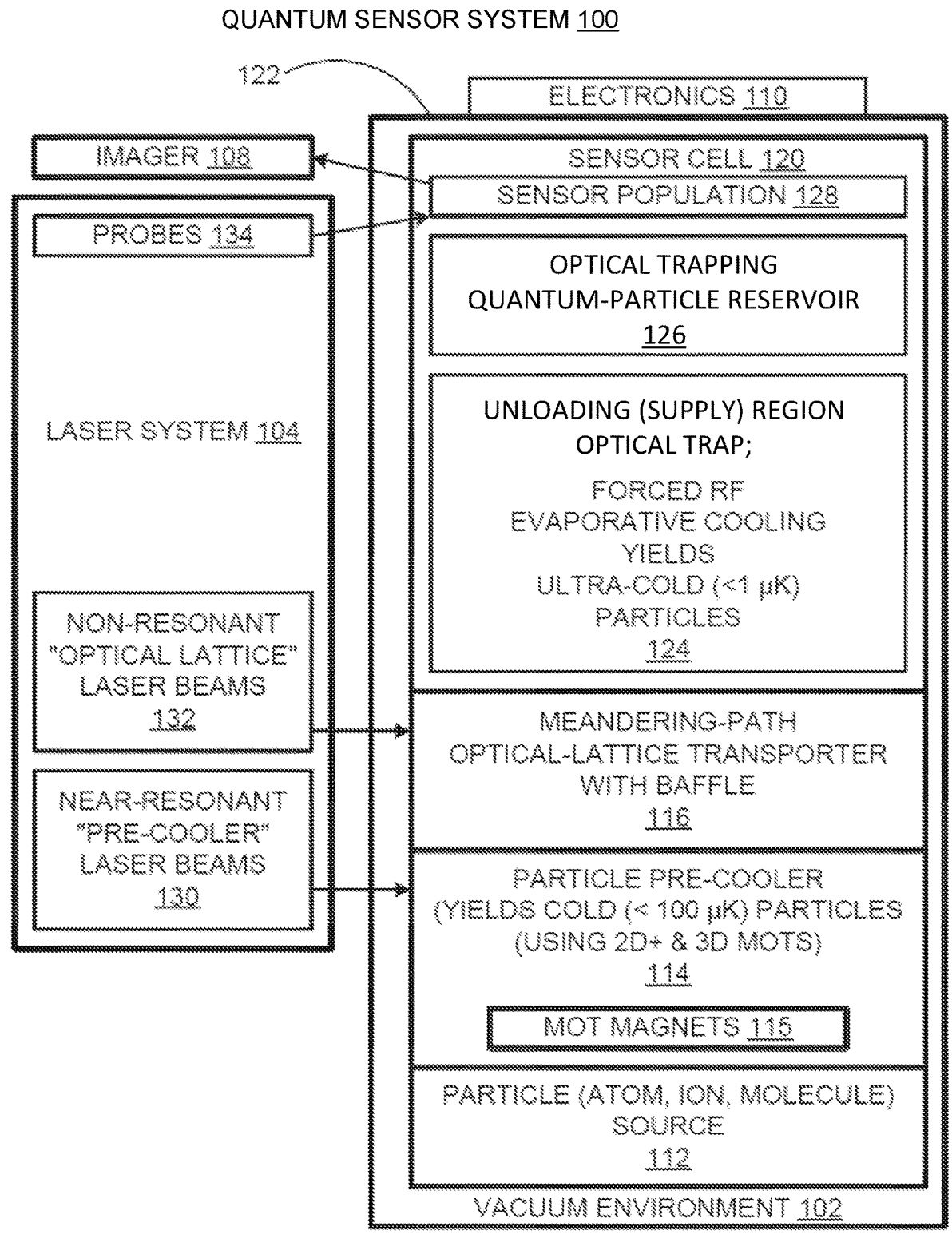
FIG. 1 is a schematic illustration of an optical-trapping continuous quantum sensor system.

As shown in FIG. 1, a quantum sensor system 100 includes a vacuum environment 102, a laser system 104, and an imager 106 for capturing sensor data used to evaluate one or more parameters, e.g., acceleration or angular momentum. Vacuum environment 102 extends across a particle source 112, a particle pre-cooler 114, a transporter 116 with a baffle, and a sensor cell 120. An atom chip 122, shown in FIG. 2, serves as a vacuum boundary wall of the sensor cell. In an alternative embodiment, all walls of the sensor cell are glass. In addition, the sensor cell can include an unloading (aka "supply") region 124, a quantum particle reservoir 126, and a sensor population 128 of particles in quantum superposition. Particle pre-cooler 114 includes magnets 115, which may be located outside vacuum environment 102.

Electronics 110, FIG. 1, located outside sensor cell 120, interfaces with the ambient side of atom chip 122. Voltages and currents generated by electronics 110 can be applied to the vacuum-facing face of atom chip 122 via conductive vias through atom chip 122. For example, currents through vacuum-side conductors of atom chip 122 can establish and control magnetic fields within sensor cell 120. These magnetic fields can be used to move, trap, and cool particles in sensor cell 120. In an alternative embodiment, such magnetic fields can be produced by an atom chip external to the sensor cell. In the illustrated embodiments, optical fields are used to move, trap, and cool atoms within the sensor cell.

Laser system 104 provides near-resonant laser beams 130 of frequencies designed to interact with the particles of interest. For example, the particles can be neutral cesium atoms $^{133}$Cs or rubidium atoms $^{87}$Rb, other alkali metal atoms, atoms of other elements, Rydberg atoms, ions, or neutral or charged molecules. The laser frequencies qualifying as "near-resonant" vary according to the species of the particles being pre-cooled. The near-resonant laser beams cooperate with magnets 115 to produce magneto-optical traps (MOTs) used to confine, trap, and cool particles in pre-cooler 114.

Laser system 104 also provides non-resonant laser beams 132. Counter-propagating pairs of non-resonant laser beams 132 interfere to produce optical lattices with bright (constructive) and dark (destructive) interference fringes. Particles are attracted and thus trapped by the bright fringes. Sweeping a frequency of a constituent laser beam can cause the fringes to move, dragging trapped particles along with the fringes. This phenomenon is leveraged in a transporter 116 to transport particles from the pre-cooler 114 to sensor cell 120.

Probes 134, resonant or near-resonant laser beams, are generated by laser system 104 to force particles in sensor population 128 out of quantum superposition for evaluating one or more parameter values. Imager 108 captures the states for the particles driven out of quantum superposition.

Figure 2:
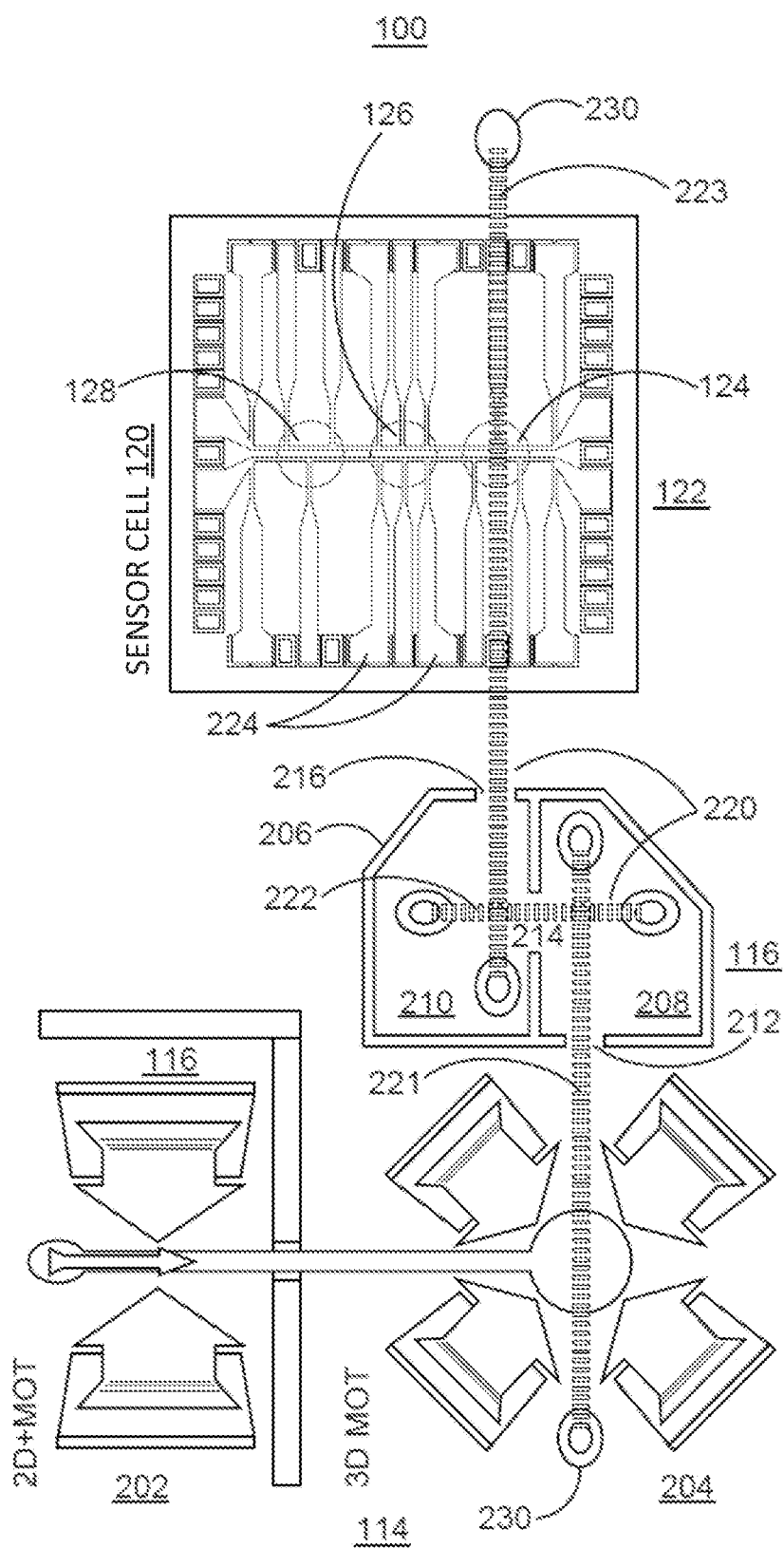
FIG. 2 is an alternative view of the sensor system of FIG. 1.

As shown in FIG. 2, pre-cooler 114 includes a 2D+ MOT 202 and a 3D MOT 204. In other embodiments, a 2D MOT or a 2D-HP MOT can be used instead of the 2D+ MOT. A 2D MOT (without the "+") uses magnets to form a quadrupole that cooperates with laser beams to confine particles radially, while allowing them to progress through and out of the 2D MOT. The particles can be laser cooled on their journey through the 2D MOT. The 2D+ MOT adds an optical molasses to slow particle progress and give more time for laser cooling. In a variation, a 2D-HP MOT is used; in this case, the optical molasses is implemented using hollow laser beams; the hollow is filled with push beams that control progress through the MOT independently of the optical molasses. This can allow optimization of the time for laser cooling and the time to reach the 3D MOT.

The 3D MOT uses evaporative cooling to reach sub 100 μK temperatures to yield "cold" particles. Higher energy particles are allowed to escape the trap, while lower energy particles remain. The result is that the average temperature decreases. In alternative embodiments, other 2D and 3D traps can be used. For example, optical 2D and 3D traps can be used to cool particles to yield cold particles.

Atom chip 122 and/or optical traps can cool cold particles to yield ultra-cold particles. However, the atom chip's ability to produce and maintain particles at ultra-cold temperatures would be compromised by the presence in sensor cell 120 of near-resonant light, e.g., that has leaked from pre-cooler 114. Accordingly, the transporter 116 used to transfer particles from pre-cooler 114 to sensor cell 120 includes a baffle 206.

Baffle 206 is a multi-chamber light box including chambers 208 and 210. An entrance pin-hole 212 to chamber 208 provides a first barrier to near-resonant light leaking from pre-cooler 114. Chamber walls are coated to absorb near-resonant light so the walls of chamber 208 serve to attenuate any light entering via pinhole 212. An inter-chamber pinhole 214 serves as a barrier to near-resonant light escaping chamber 208 to chamber 210. Absorbent walls of chamber 210 attenuate near-resonant light entering chamber 210 from chamber 208. Finally, an exit pinhole 216 serves as a further barrier to near-resonant light escaping baffle 206.

Transporter 116 uses a series 220 of optical lattices 221, 222, 223 to carry cold particles along a meandering path through pinholes 212, 214, and 216 and thus through baffle 206 to sensor cell 120. Each optical lattice is formed using a respective pair of counter-propagating laser beams, which interfere to produce bright and dark fringes; the particles are attracted to and trapped by the bright fringes. Sweeping a phase or frequency of one of the counter-propagating laser beams causes the fringes and, thus, the cold particles, to move. The optical lattices 221, 222, and 223 are one-dimensional lattices that are constrained to moving along straight-line segments. Changes in direction result from handing off particles from one optical lattice to another. In alternative embodiments, multi-dimensional lattices are used for direction changes to implement a meandering path through a baffle for cold particles. As shown in FIG. 2, mirrors 230 are used to redirect laser beams going into the page (z direction) to directions within the plane of the page.

After transportation by the optical lattices, the cold particles are off-loaded at supply region 124 of the sensor cell. Atom chip 122 or optical traps can confine the cold particles, e.g., using a harmonic magnetic field or an optical field and then cool them using forced radio-frequency (RF) evaporative cooling to yield ultra-cold particles at a temperature below 1 μK and, in some embodiments, below 0.1 μK. In the illustrated embodiment, the particles are cooled to about 50 nk to form a Bose-Einstein condensate (BEC). The confining and cooling are achieved, at least in part, by optical fields or magnetic fields created by currents through conductors 224 of atom chip 122.

Atom chip 122 or optical traps transfer the ultra-cold particles from supply region 124 to reservoir 126, which can also be confined by an optical trap or a harmonic magnetic potential generated by atom chip 122, in some embodiments, additional forced rf evaporative cooling is applied to particles in the reservoir to maintain a desired ultra-cold temperature.

In an alternative embodiment, transporter 116 uses an optical lattice to deliver cold particles directly to the reservoir. Traps can then cool the cold particles to ultra-cold temperatures. However, off-loading the cold particles and cooling them at a supply region separate from the reservoir avoids any delay involved in the cooling when responding to demand from the sensor population for reservoir particles. In addition, the bright fringes of the optical lattice reaching the reservoir may cause undesirable interactions with the population already in the reservoir. Furthermore, off-loading the cold particles away from the reservoir allows control of both the inputs to and the outputs from the reservoir. The atom chip can delay an input to the reservoir if it conflicts with an output from the reservoir; in other words, the atom chip can delay an input (the timing of which is not critical) to give priority to an output (the timing of which may be critical).

In some embodiments, some of the cooling is performed in the sensor cell but outside the reservoir, while the remainder of the desired cooling takes place in the reservoir. This reduces any delay due to cooling at the reservoir, while leaving it to the reservoir to achieve the desired temperature. For example, the reservoir can be tasked with providing the final cooling required to form a BEC. Since multiple batches of particles can be represented in the reservoir at any given time, it cannot be assumed that the particles share the same state. Heating and re-condensing particles in the reservoir to re-form a unified BEC may be appropriate for applications requiring all particles in the reservoir to be in the same state.

Evaporative cooling is a batch-mode process. Cold atoms leave the 3D MOT in hatches and ultra-cold atoms enter the reservoir in batches. The reservoir acts as a buffer that accepts batch inputs and outputs continuously or otherwise promptly upon demand to replenish the sensor population.

The sensor population can include particles in a BEC or other ultra-cold state. They may be confined by harmonic magnetic potentials generated by the atom chip or by magnetic optical traps, or by optical traps (e.g., a 3D optical lattice). The particles may be in quantum superposition, reacting to physical phenomenon. Laser probes 134 (FIG. 1) can interact with the sensor particles to force them out of quantum superposition for imaging by imager 108. The particles lost due to the probing can be immediately replenished by particles from reservoir 126.

Figure 3:
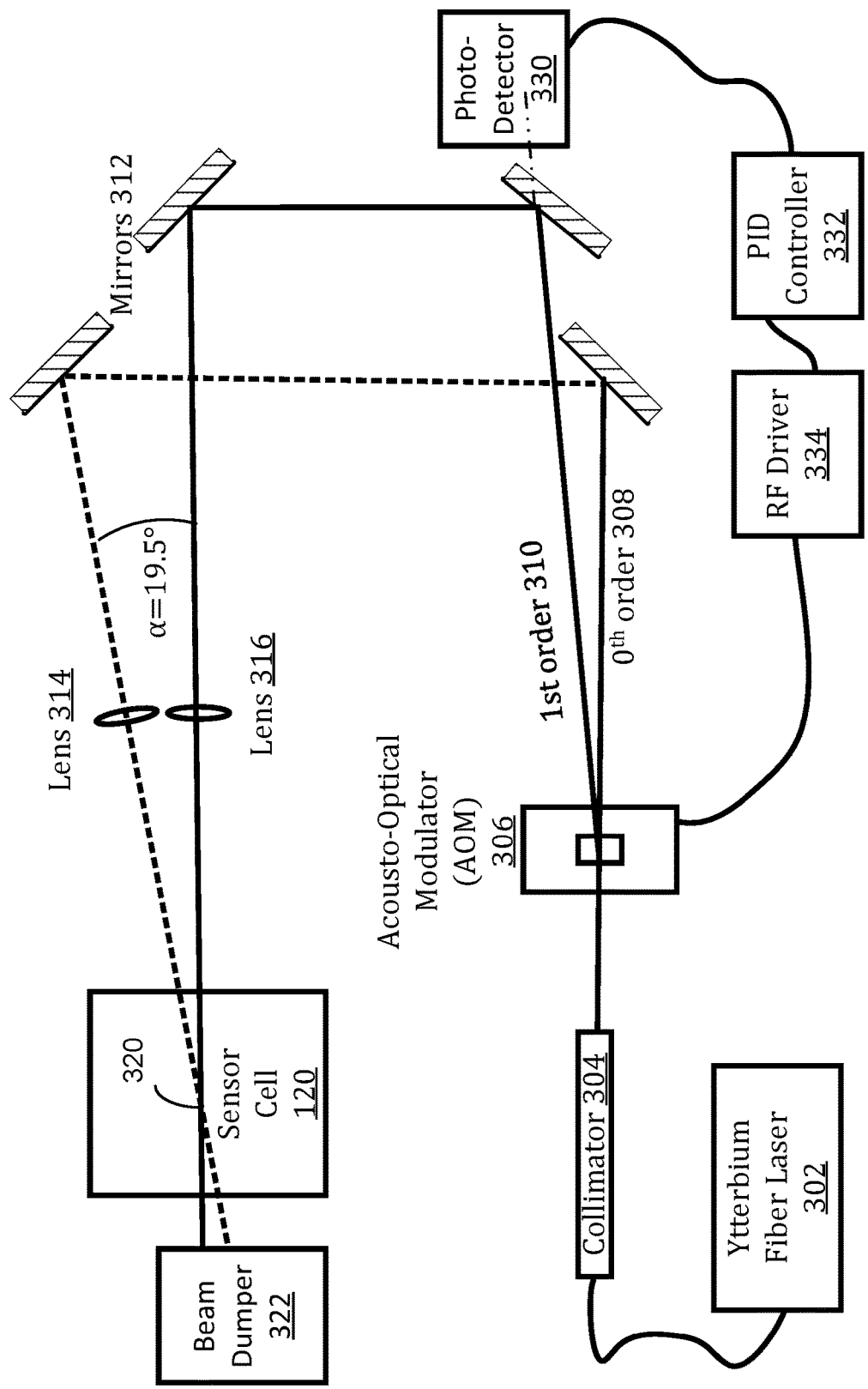
FIG. 3 is a view of some of the components of the sensor system of FIG. 1 showing how optical traps are formed within the sensor cell.

All-optical traps can be formed at unloading zone 124, reservoir 128, and sensor population 128 using the laser system components shown in FIG. 3. A ytterbium fiber laser 302 outputs to a collimator 304, which feeds an acousto-optical modulator (AOM) 306. AOM outputs $0^{th}$ order and $1^{st}$ order beams 308 and 310, which are directed by mirrors 312 through respective lenses 314 and 316 into sensor cell 120. Within sensor cell 120, beams 308 and 310 intersect at a 19.5° angle to define an optical trap 320. Once beams 308 and 310 exit sensor cell 120, they are disposed of using a beam dumper 320. A portion of $1^{st}$ order beam 310 is picked off and detected by photo-detector 330, the output of which is input to a proportional-integral-derivative (PID) controller 332, which is used to control a radio-frequency (RF) driver 334 that, in turn, controls AOM 306. Alternatively, optical traps can be formed as described in "All-optical $^{87}$Rb Bose-Einstein condensate apparatus: Construction and operation", a Ph.D. thesis by I. L. H. Humbert, submitted to The University of Queensland in 2012, School of Mathematics and Physics.

Figure 4:
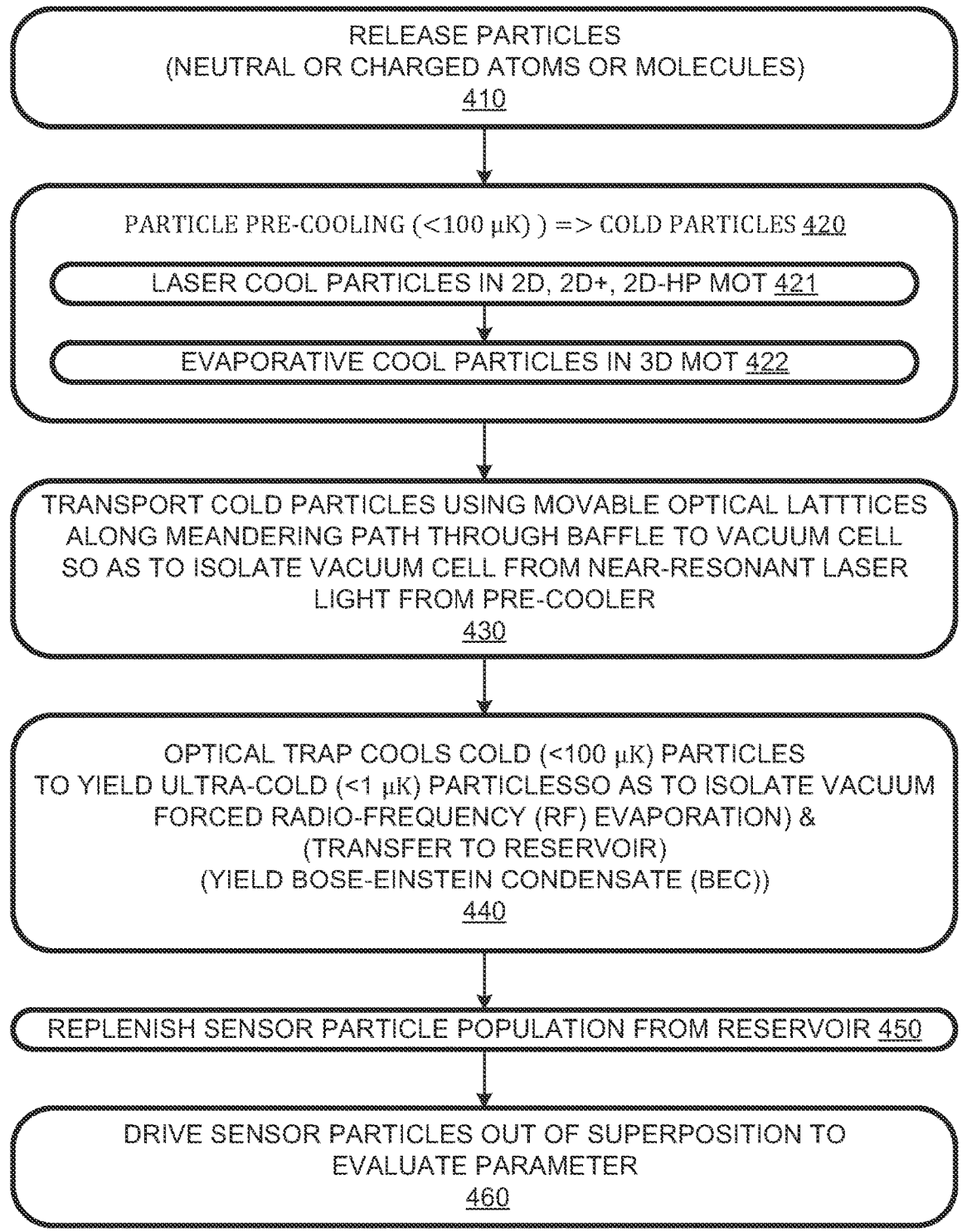
FIG. 4 is a flow chart of an optical-trapping continuous quantum sensing process, implementable in the sensor system of FIG. 1 and in other systems.

A sensor replenishment process 400, flow charted in FIG. 4, can be implemented in sensor system 100 and in other systems. At 410, particles (e.g., Rydberg and other neutral atoms of Lithium 7, Cesium 133, Rubidium 87, or other alkali or non-alkali elements), ions, and charged and neutral molecules) are released, e.g., by heating an ampule filled with the species of interest.

At 420, particles are cooled to yield cold particles below 100 µK. In some embodiments, this is a two-step process. First, particles are cooled in a 2D (which may be a 2D+ or 2D-HP) MOT to near a Doppler limit, and then cooled further by evaporative cooling in a 3D MOT to yield cold-particles.

At 430, a transporter transfers the cold particles to a sensor cell. In some embodiments, the transport is via a meandering path through a baffle designed to prevent near-resonant light leaking from the 3D MOT from reaching the sensor cell. To this end, the transporter sweeps the frequencies of laser beams used to form optical lattices so as to move interference fringes to which the cold particles are attracted.

Depending on the embodiment, the cold particles may be delivered to a reservoir in the sensor cell directly or to a separate supply region in the sensor cell for later transfer to the reservoir by optical or magnetic fields of the sensor cell. In either case, at 440, the cold particles are further cooled to below 1 µK to yield ultra-cold particles. Depending on the embodiment, the temperatures may be below 0.1 µK., i.e., below 100 nanoKelvin (nk). For example, the particles can be cooled to about 50 nK to form a BEC. The cooling can be performed in the reservoir or at the supply region or both. To cool the cold particles, the traps can confine them and then use forced rf evaporation for the actual cooling. The series of actions iron. 410-440 can be repeated, e.g., in a pipelined manner, for additional batches of particles.

At 450, a sensor particle population is replenished by transferring ultra-cold particles from the reservoir to the sensor population. In some embodiments, the transfer is completed under atom-chip control. In other embodiments, at least some of the transfer can be effected using optical lattices and/or other optically generated devices such as bottle beams.

At 460, the sensor population is "read out", e.g., by using a probe beam to knock some or all sensor particles out of quantum superposition and imaging the resulting particle distribution to evaluate a parameter, e.g., angular momentum or acceleration. Since this read out depletes it, the sensor population can be replenished as process 400 returns to 450 to begin the next replenishment iteration.

As used herein, the term "particle" is equivalent to "molecular entity" as defined in the International Union of Pure and Applied Chemistry (IUPAC) Goldbook to mean: "Any constitutionally or isotopically distinct atom, molecule, ion, ion pair, radical, radical ion, complex, conformer, etc., identifiable as a separately distinguishable entity."

Herein, "cold" refers to temperatures below 1 milliKelvin (1 mK), and "ultra-cold" characterizes particle temperatures below 1 µK. Depending on the embodiment, the ultra-cold particles can further be below 0.1 µK, otherwise expressed as 100 nK. For example, in an exemplary BEC, the temperature can be about 50 nK.

Herein, "cooling" can include laser cooling, polarization gradient cooling, Doppler cooling (e.g., involving optical molasses), evaporative cooling (including forced radio frequency evaporative cooling), and combinations thereof. Much of the cooling occurs with particles in "traps", including 2D, 2D+, 2D-HP, and 3D magneto-optical traps, optical traps including 3D lattices, and harmonic magnetic potential traps, e.g., established on an atom chip.

Herein, a "baffle" is a structure designed to trap light, e.g., to prevent it from reaching some destination, such as a sensor cell from a 3D MOT cell. For example, in the illustrated embodiment, a baffle defines a narrow meandering (non-straight) path through a baffle such that very little light entering the baffle can follow that meandering path and escape the baffle. In some embodiments, a baffle may absorb light that hits baffle walls; in other cases, light may be directed away from the destination to be protected from the light. In the illustrated embodiment, it is the near-resonant light escaping a 3D MOT cell that is to be prevented from reaching a sensor cell.

Herein, "meandering" means "not straight". A meandering path can include a series of two or more straight line segments arranged to cause the carried content to change directions en route to their destination; such paths can be implemented using a series of one-dimensional optical lattices. Also, meandering encompasses paths with curves; such curved paths can be implemented using multi-dimensional optical lattices. An optical lattice can be established by interfering counter-propagating laser beams, which produces constructive (bright) and destructive (dark) fringes. Particles may be attracted and thus trapped by the bright fringes. Sweeping phase and/or frequency of at least one of the counter-propagating beams can cause the fringes to move, carrying the trapped particles along. Thus, the optical lattices function as an optical conveyor belt for the particles.

Herein, "quantum physics sensor" refers to devices that use particles in superposition to respond to physical stimuli (such as heat, light, sound, pressure, magnetism, or a particular motion) and transmit a resulting impulse (as for measurement or operating a control). "Quantum computational sensor" refers to devices that use particles in superposition to represent an intermediate or final quantum computational result. Herein, unless it is clear from context that the term "sensor" encompasses a quantum computational sensor, "sensor" means "quantum physics sensor". Herein, "replenish" means "to add to an existing population so as to return it to a greater previous quantity."

Herein, art labelled "prior art, if any, is admitted prior art; art not labelled "prior art" is not admitted prior art. The illustrated embodiments, variations thereupon, and modifications thereto are within the invention's scope, which is defined by the following claims.

What is claimed is:

1. An optical-trapping quantum sensor replenishment comprising:
    cooling, in an optical trap of a sensor cell, pre-cooled particles having a temperature below 100 microKelvin (µk) to yield ultra-cold particles below 1 µk, wherein the cooling provides the ultra-cold particles in a reservoir in batches;
    maintaining the ultra-cold particles in the reservoir within the sensor cell; and
    transferring the ultra-cold particles from the reservoir to replenish a sensor population of particles, wherein the transferring includes continuously transferring the ultra-cold particles from the reservoir to the sensor population during a sensor use.

2. An optical-trapping quantum sensor replenishment process comprising:

cooling, in an optical trap of a sensor cell, pre-cooled particles having a temperature below 100 microKelvin (μk) to yield ultra-cold particles below 1 μK, wherein the cooling provides the ultra-cold particles in a reservoir in batches; and maintaining the ultra-cold particles in the reservoir within the sensor cell; and transferring the ultra-cold particles from the reservoir to replenish a sensor population of particles, wherein the transferring includes transferring the ultra-cold particles from the reservoir to the sensor population in response to a sensor demand.

3. A sensor system comprising:

a sensor cell;

a laser system for establishing at least one optical trap within the sensor cell to cool pre-cooled particles from below 100 microKelvin (μk) to below 1 μK to yield ultra-cold particles and to maintain the ultra-cold particles in a reservoir; and a sensor replenisher for transferring the ultra-cold particles from the reservoir to a sensor population of particles in quantum superposition, wherein the sensor replenisher transfers the ultra-cold particles from the reservoir to the sensor population continuously during a sensor use or in response to a sensor demand.

* * * * *